United States Patent [19]

Law et al.

[11] Patent Number: 4,913,385

[45] Date of Patent: Apr. 3, 1990

[54] SELF-LOCKING STRAIN RELIEF BUSHING FOR VARIABLE PANEL THICKNESSES AND METHOD

[75] Inventors: Joseph P. Law, Scotch Plains; Thomas M. Mullen, Jr., Dunellen, both of N.J.

[73] Assignee: Heyco Molded Products, Inc., Kenilworth, N.J.

[21] Appl. No.: 351,387

[22] Filed: May 10, 1989

[51] Int. Cl.[4] .......... H02G 3/18

[52] U.S. Cl. .......... 248/56; 29/433; 174/153 G

[58] Field of Search .......... 248/56, 74.1, 73; 174/153 G, 151 G, 65 G; 16/2; 434/449; 29/433

[56] References Cited

U.S. PATENT DOCUMENTS

| | | | |
|---|---|---|---|
| 2,974,186 | 3/1961 | Klumpp, Jr. | 174/153 G |
| 3,290,430 | 12/1966 | Klumpp, Jr. et al. | 174/153 G |
| 3,464,659 | 9/1969 | Klumpp, Jr. et al. | 174/153 G |
| 3,953,665 | 4/1976 | Nicholson | 148/56 X |
| 3,958,300 | 5/1976 | Tanaka | 16/2 |
| 4,000,875 | 1/1977 | Jemison et al. | 248/56 |
| 4,034,944 | 7/1977 | Moran | 439/449 X |
| 4,432,520 | 2/1984 | Simon | 248/56 |
| 4,568,047 | 2/1986 | Matsui | 248/56 |
| 4,646,995 | 3/1987 | Matsui et al. | 248/56 |
| 4,729,534 | 3/1988 | Hill et al. | 248/56 |

*Primary Examiner*—Ramon O. Ramirez

*Attorney, Agent, or Firm*—Auslander & Thomas

[57] ABSTRACT

A one piece molded plastic strain relief bushing includes a well and key. The portions of the bushing may be engaged, latched in the well. The latching within the well serves the double function of holding the bushing with a cable engaged and compactly providing such holding with a maximum of strength and a minimum of bulk. The bushing enables saving of cost in the insertion of the cable into the bushing and saving cost, inserting the bushing with the cable into an aperture.

72 Claims, 3 Drawing Sheets

FIG.1
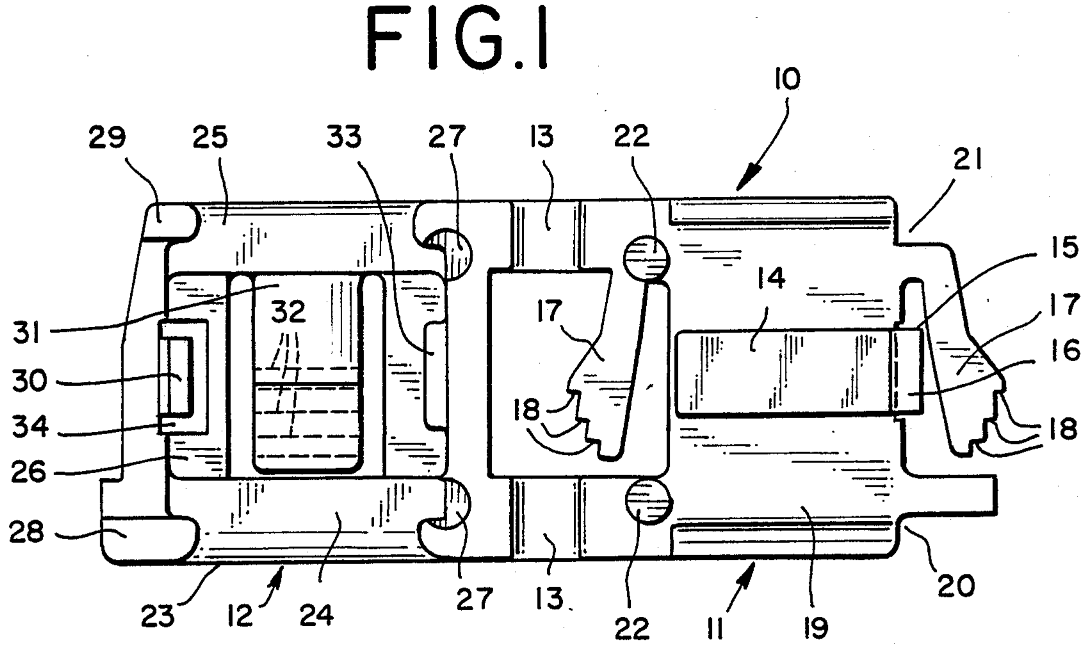
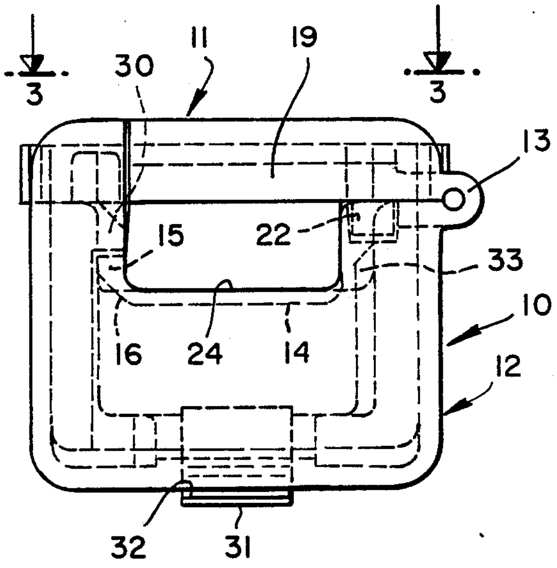
FIG.2
FIG.3
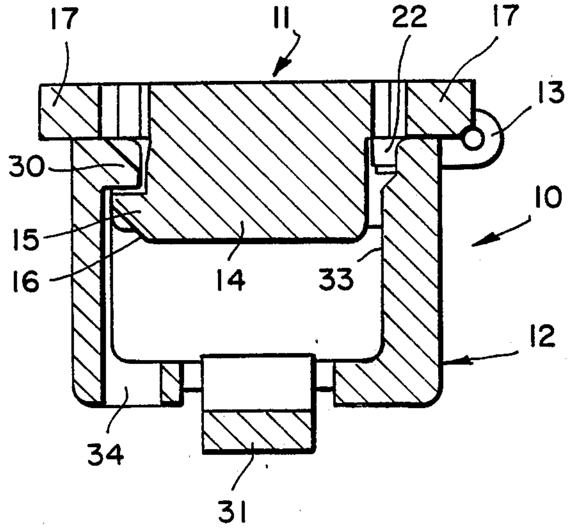

FIG.4
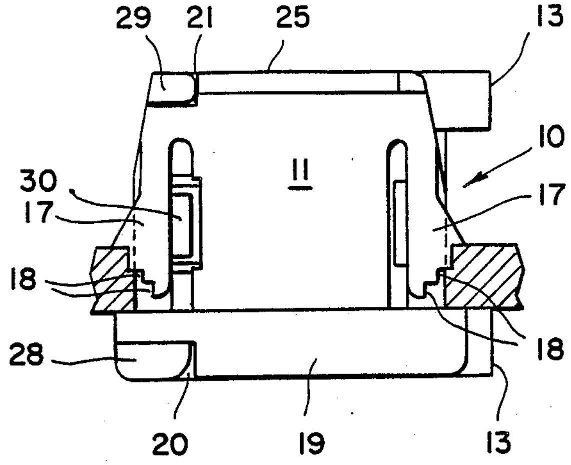
FIG.5
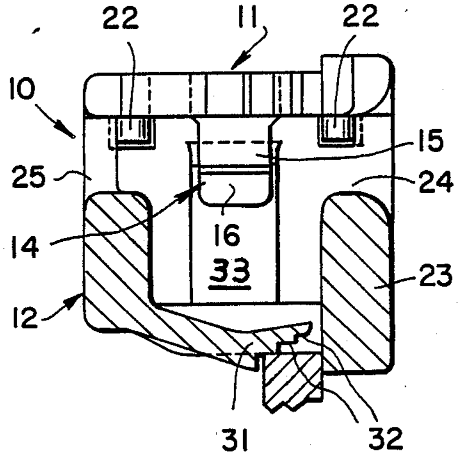
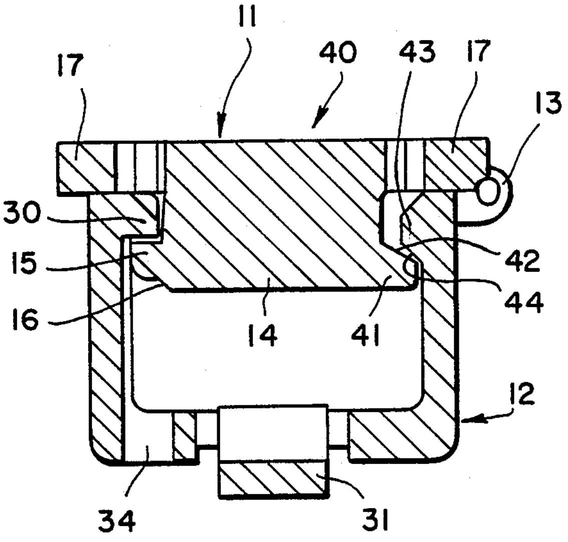
FIG.6
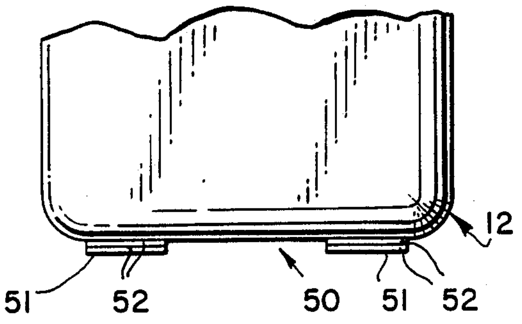
FIG.7

SELF-LOCKING STRAIN RELIEF BUSHING FOR VARIABLE PANEL THICKNESSES AND METHOD

BACKGROUND OF THE INVENTION

The present invention is a one piece molded plastic strain relief bushing, in which cable may be set in the flat, unencumbered, open bushing configuration, either manually or by machine automation then locked between the closed bushing portions. The assembled cable and bushing may then be engaged in an aperture either manually or by an automated system without the need for special tools or expensive skilled labor. The bushing fits firmly within an aperture with an effective multipoint grasp. The bushing is preferably rectangular and adapted for a rectangular aperture.

In the crowded strain relief bushing art where millions of bushings are used yearly in an infinitude of components, particularly electronic components, small changes in structural components and their arrangement can mean substantial overall saving in part and/or labor costs or both, as well as bushing effectiveness. A labor intensive, expensive cost of electronic components of the past has been the assembly of cord sets for insertion into an aperture in a panel or the assembly in a bushing of a cable, wire or other long thin flexible items, requiring strain relief protection.

The assembly has oftentimes required manual assembly with special tools for cable held in a bushing being snapped into an aperture. A partial solution to the awkwardness of maintaining a cable in a bushing for insertion was to lock the bushing parts with the cable engaged. The bushings of the past themselves generally comprised two portions joined by some form of webbing. The webbing oftentimes complicated the engagement of the cable in the bushing.

The present invention is a structurally simple strain relief bushing with a novel lock in the well. The structure of the bushing enables effective automated assembly of cable and bushing, effective locking of the bushing and cable, economy of size, maxixmum strength, ease of insertion of the assembled bushing and cable into a aperture and limits the number of different bushing constructions necessary to meet the needs of different panel thicknesses.

DESCRIPTION OF THE RELATED ART

U.S. Pat. No. 4,493,467 shows a complex prior art strain relief structure with a hinged portion adapted to lock a cable in strain relief engagement in a bushing. The bushing also includes fingers engagable with the wall of an aperture in a panel. The engagement of the cable is not adapted to the labor saving engagement of cable in the bushing nor of the simple automation of such engagement.

U.S. Pat. No. 4,117,998 is another prior art rectangular type bushing having a juxtaposed two part hinged construction and a hook engagement adapted to close the bushing portions over a cable. The bushing is not snap engagable in an aperture nor is it easily adaptable for the simple insertion or automated insertion of a cable.

Another prior art rectangular type bushing, similar to U.S. Pat. No. 4,117,998 has four rigidizing pins engagable within the well to prevent rotation of the bushing portions. It is not though adapted to easy snap fitting into an aperture and it has a separate hook and latch configuration outside well which necessitates greater bulk for the bushing.

There are of course lockable cable engagable fittings that can snap fit into a aperture such as in U.S. Pat. No. 3,958,300. Fittings such as this are bulky, without concentrated strain relief capabilities and not easily adaptable to easy or automated insertion of cable into the bushing.

Rectangular bushings such a disclosed in British Pat. Nos. 1,333669 and 1,418,634 have no key and depend on a separate hook and latch to lock the bushing and they are not clearly adapted to snap fit into an aperture.

In U.S. Pat. Nos. 3,290,430 and 3,464,659 among others are strain relief bushings, where the bushing portions are held away from each other by straps. Although they snap fit into apertures and even have the advantage of snap fingers with shoulders, the bushing portions are not easily adapted to the easy or automated insertion of cable nor the insertion of and assembled cable and bushing with unskilled labor or without special tools.

U.S. Pat. Nos. 2,563,604 and 2,974,186 among others are strain relief bushings are held by hinges. Although they snap fit into apertures the bushing portions are not easily adapted to the to easy or automated insertion of cable nor the insertion of and assembled cable and bushing with unskilled labor or without special tools. U.S. Pat. Nos. 2,895,003, 3,953,665 and 4,568,047 among others are strain relief bushings where the bushing portions are held by end or head straps. Although they snap fit into apertures the bushing portions are not easily adapted to the to easy or automated insertion of cable. The straps also are in way of the easy insertion of the cable in the bushing.

SUMMARY OF THE INVENTION

The present invention is a one piece molded plastic strain relief bushing adapted for automation. The bushing has a key and a well and is molded with its portions open and juxtaposed. The bushing employs an interactive latch within the well to maintain cable within the well of the bushing. Cable may be set in the flat, open bushing configuration, either manually or by machine automation then snap locked between the closed bushing portions. The configuration of the present invention is adapted to an easy, compact and snug locked fit of cable. The compact bushing of the present invention further snaps fits into an aperture with cable engaged in the bushing. The cable in the bushing is engaged without the need for special tools or expensive skilled labor. A rectangular shaped bushing of the present invention fits firmly within a rectangular aperture with an effective multipoint grasp.

The open juxtaposed configuration of the bushing portions promotes an economy in the assembly of the cable in the bushing either manually or by machine automation.

The gripping means is adapted to fit a selection of aperture wall thicknesses, thus reducing the number of bushing configurations that have to be provided for different applications.

The bushing includes a rigidizing system to prevent rotative movement of the bushing portions, thus protecting particularly against fatigue and damage to the hinge of the assembled bushing and cable before engagement in an aperture. The rotation protection is particularly important in the automated assembly system since there often is a lag time and handling need between the assembly of the cable with the bushing and the engagement of the bushing in an aperture.

Effective strain relief bushings of the past have generally been one piece, two part bushings tied together with a strap or hinge, then manually or tool inserted into an aperture with a cable held within the folded bushing. Of the most effective bushings used in the past, the cable generally passed through the bushing and was held in a substantially vertical or horizontal U shape or S shape in a well by a key. Once engaged in an aperture, the bushing was generally held in a peripheral slot in the bushing or by fingers and locked into the aperture.

Bushings of this sort provided excellent strain relief and excellent gripping within the aperture, but generally required manual assembly and/or a special tool to insert the bushing into the aperture until it locked. Variations in such bushings included bushings with resilient fingers to grasp the walls of the aperture. An advantage of the resilient fingers was that they were adaptable with a selection of shoulders to have a single bushing adaptable to a selection of wall thicknesses.

The use of fingers did not solve the problem with regard to being able to automate the process of assembling bushings with cables in apertures, since a tool was generally required to hold the bushing, with a cable inserted, together, when the bushing was inserted.

Some bushings of the past were hinged. They, nonetheless, did not solve the problem of adapting to the automation of the insertion of the cable in the bushing, or relieve the need for skilled labor and usually a special tool to hold the bushing for insertion.

The present invention adapts for automating the insertion of cable into a bushing having both a key and a well, or improves the manual insertion of cable in a bushing. The bushing enables labor cost saving in the engagement of cable within the bushing and the engagement of the bushing with cable into an aperture. The bushing construction allows a compact structure and strength within that compact structure.

Particularly in view of the need for automation, the bushing of the present invention is modular. A limited number of bushing sizes are required to meet different applications in view of the adaptability of the grasping fingers to several aperture wall thicknesses.

Another important feature of the present invention is that the latched bushing is rigidized by the interaction of columns and openings and pins and openings distributed about the apposing surfaces of the two portions of the bushing. The importance of this is that the small hinge is fragile, and particularly, where bushings may be automatically attached to cable and left for insertion at a subsequent time, lateral or longitudinal motion of the two bushing portions may fatigue the hinge and release the bushing from the cable. The arrangement of the columns and pins is effective to maintain strength within a compact, effective construction.

A rectangular configuration of the bushing in a rectangular aperture, enables a firm grasping of the aperture walls by the simple configuration of multipoint spaced grippers. Thus, a rectangular bushing in a rectangular opening is firmly held within the aperture by the multipoint gripping means of the present invention with three or more spaced grippers. At least one set of apposed gripper and a third or a fourth gripper holds the bushing firmly in the aperture against any pivoting.

According to the present invention a one piece molded plastic strain relief bushing includes a body through which a cable may be engaged. The body includes a first portion and a second portion joined by a hinge. The one portion generally includes a key, a head, and gripping means. The other portion generally includes a head, a well and gripping means. The first and second portions are engagable within the well. The key holds a cable in the well when the first and second portions are latched. The portions' gripping means are engaged within the walls of an aperture between the gripping means and the head. The key is engagable with a latch. The key may include a detent for engaging the latch, the detent may cam on the latch and the the key may be substantially athwart the width of the first portion.

The cable may be crimped held within the well in a substantially vertical or horizontal U shape or S shape. There may be more than one hinge including a hinge at the front of the bushing and a hinge at the rear of the bushing. The latch may be resilient and flex to engage the key. The first portion's gripping means may be fingers which may angulate outward extending forward substantially from the rear of the first portion and they may resiliently flex. The second portion's gripping means may also be fingers which may resiliently flex. The fingers include at least one shoulder.

The second portion's gripping means may be fingers which may resiliently flex and also include at least one shoulder.

The bushing may define a substantially rectangular configuration when latched.

The first and second portions may interact to rigidize the bushing. This may be done with at least one interactive set of columns and openings or with at least one interactive set of pins and openings or with both.

The first portion's gripping means may be substantially adjacent either end of the key and the second portion's gripping means may be beneath the well.

The bushing may define a substantially rectangular configuration when latched and the first and second portions' gripping means may, when engaged, define a substantially triangular configuration. The bushing may engage the walls of an aperture between the first and second portions' gripping means and the first and second portions' heads. The second portion of the bushing may include several gripping means.

There may be interactive support means between the first and second portions and the key may include support means interactive with the second portion. The support means may include a detent on the key, interactive with said second portion and may include a protrusion in said second portion which may be rotatably interactable with the key's support detent.

The head of one portion may have a cover to turn cable before entering the bushing. The key may be narrow.

The method of assembling a strain relief bushing with a cable engaged in an aperture includes the steps of providing a one piece molded plastic strain relief bushing which receives the cable. A first portion and a second portion are provided with a hinge for the first portion and second portions. One portion is provided with a key, a head, and gripping means. The other portion is provided with a head, a well and a gripping means. A latch is provided in the well. The latch is adapted to engage the first and second portions. The key holds a cable in the well when the latch is engaged. The portions' gripping engage the walls of an aperture between the gripping means and the head. A cable is placed through the body and the first portion and the second portions are engaged, latched so that the cable is held in the well of the bushing by the key. The key may be provided engagable with the latch and also with a detent for engaging the latch. The detent may be provided with means to cam on the latch and the the key may be provided substantially athwart the width of the first portion.

Under the method the cable may be crimped into the well in a substantially vertical or horizontal U shape or S shape. More that one hinge may be provided including a hinge at the front of the bushing and a hinge at the rear of the bushing. The latch may be provided resilient and flexible to engage the key. The first portion's grippers may be fingers provided which may angulate outward extending forward substantially from the rear of the first portion and they may provided to resiliently flex. The second portion's gripping means may also be provided with a finger which may resiliently flex. The fingers may be provided with at least one shoulder.

The bushing may be provided, defining a substantially rectangular configuration when the latch is engaged.

The first and second portions may be provided to be interactable to rigidize the bushing. This may be done by providing at least one interactive set of columns and openings or at least one interactive set of pins and openings or with both.

The first portion's gripping means may be provided substantially adjacent either end of the key and the second portion's gripping means may be provided beneath the well.

The bushing may be provided defining a substantially rectangular configuration when the latch is engaged and the first and second portions' gripping means may, when engaged define a substantially a triangular configuration. The bushing may be provided to engage the walls of an aperture between the first and second portions' grippping means and the first and second portions' heads. The bushing may be engaged in an aperture.

The second portion of the bushing may be provided including a plurality of gripping means and the key may be provided including support means which may be interacted with the second portion. The support means may be provided including a detent on the key. The detent may interact with the second portion. The second portion may be provided with a protrusion which may rotatably interact with the detent on the key.

Although such novel feature or features believed to be characteristic of the invention are pointed out in the claims, the invention and the manner in which it may be carried out, may be further understood by reference to the description following and the accompanying drawings.

BRIEF DESCRIPTION OF THE DRAWING

FIG. 1 is a top plan view of the one piece molded plastic strain relief bushing of the present invention.

FIG. 2 is a front elevation of the one piece molded plastic strain relief bushing of FIG. 1 with the first portion engaged with a second portion.

FIG. 3 is a section of FIG. 2 along lines 3—3.

FIG. 4 is a top plan view of the one piece molded plastic strain relief bushing of FIG. 2 shown engaged in an aperture of a panel.

FIG. 5 is a partially cut away left side section of the one piece molded plastic strain relief bushing of FIG. 4 shown engaged in an aperture of a panel.

FIG. 6 is a front elevation section of another embodiment of the one piece molded plastic strain relief bushing including support means on the key, interactive with said second portion.

FIG. 7 is a broken away detail of a front elevation of the one piece molded plastic strain relief bushing of the present invention including a plurality of grippers on the second portion.

Referring now to the figures in greater detail, where like reference numbers denote like parts in the various figures.

DESCRIPTION OF THE PREFERRED EMBODIMENTS

Figure 9:
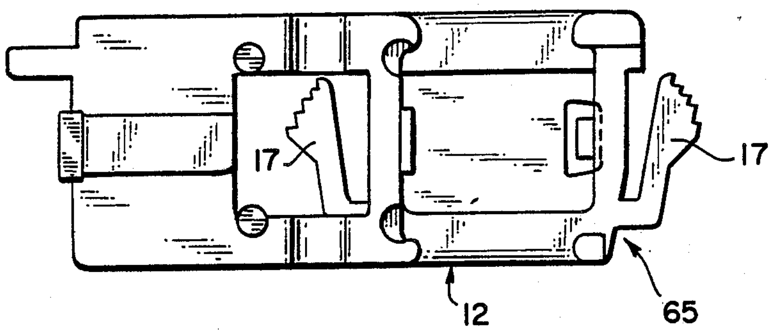
FIG. 9 is a top plan view of another embodiment of the one piece molded plastic strain relief bushing of the present invention including flexible fingers extending from the sides of the second portion.

The one piece molded plastic strain relief bushing 10 includes a first portion 11 and a second portion 12. The first portion 11 and second portion 12 are joined by hinges 13. The first portion 11 includes a key 14. The key 14 includes a detent 15 which includes a camming surface 16. There is also a pair of resiliently flexible fingers 17 on either side of the first portion 11. The fingers 17 each include shoulders 18. The first portion 11 has a head 19. There is a cutout forming an opening 20 in the head 19. At the rear end of the first portion 11 is another cutout portion forming an opening 21. There is a pair of pins 22 in the first portion 11.

The second portion 12 includes a head 23 with an opening 24 in its face. The second portion 12 has another opening 25 at its rear. The openings 24, 25 define the upper walls of a well 26 in the body of the second portion 12. The head 23 includes openings 27 which are adapted to receive the pins 22. The head 23 also includes a column 28 adapted to receive an opening 20 in the first portion 11. The rear portion of the second portion 12 also includes another column 29 adapted to receive the opening 21 of the first portion 11. The second portion 12 includes a latch 30 which is adapted to interact with the detent 15 of the key 14. A gripping finger 31, resiliently flexible, extends from the rear of the second portion 12. The gripping finger 31 has shoulders 32 as can best be seen in FIG. 5. The second portion 12 includes a reinforcing wall 33 adjacent one end of the key 14. There is a mold core opening 34 surrounding the latch 30. The mold core opening 34 occurs by the insertion of the mold core in the molding of the latch 30 in the molding of the bushing.

As shown in FIG. 6, another embodiment of the present invention is a one piece molded plastic strain relief bushing 40. The one piece molded plastic strain relief bushing 40 includes a key 14 with a second detent 41 at its other end. The second detent 41 including a camming surface 42 adapted to engage a supporting protrusion 43. The supporting protrusion 43 has a camming surface 44 for interaction with the camming surface 42.

FIG. 7 shows a detail of another embodiment of a one piece molded plastic strain relief bushing 50 which includes two spaced grippers 51 with shoulders 52.

Figure 8:
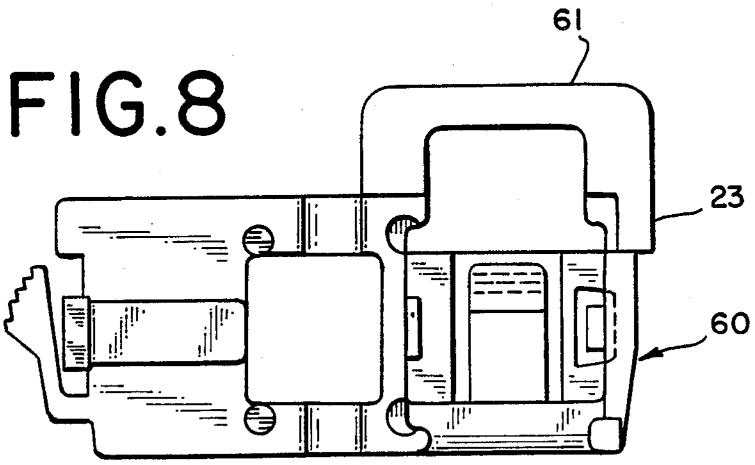
FIG. 8 is a top plan view of another embodiment of the one piece molded strain relief bushing of the present invention adapted to receive a cable with a 90° bend.

As shown in FIG. 8, another embodiment of the present invention is a one piece molded plastic strain relief bushing 60. The one piece molded plastic strain relief bushing 60 includes a cover 61 on the head 23 which turns a cable 90° as it enters the cover of the one piece molded plastic strain relief bushing 60 of the present invention.

As shown in FIG. 9, another embodiment of the present invention is a one piece molded plastic strain relief bushing 66. The one piece molded plastic strain relief bushing 65 includes fingers 17 extending from the sides of the second portion 12.

Figure 10:
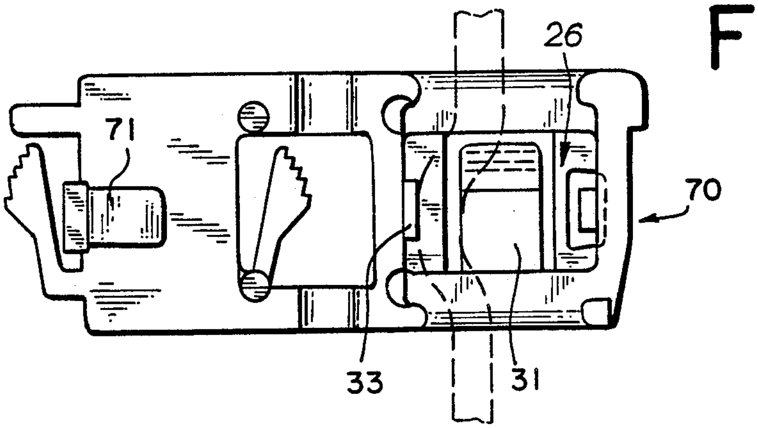
FIG. 10 is a top plan view of another embodiment of the one piece strain relief bushing of the present invention including a narrowed key.

As shown in FIG. 10, another embodiment of the present invention is a one piece molded plastic strain relief bushing 70. The one piece molded plastic strain relief bushing 70 includes a narrow key 71. As can be seen in phantom a cable may be held in strain relief engagement in the well 26 between the narrow key 71 and the reinforcing wall 33.

In use, the one piece molded plastic strain relief bushing 10 is in flat open position with the first portion 11 and second portion 12 on a plane joined by the hinges 13. In this form, cable can be manually or uutomatically placed in the second portion 12 with the first portion 11 rotatable so that the key 14 holds the cable in the well 26 in substantially a U shape or S shape. The integral detent 15 on the key 14 engages itself with the latch 30, holding the cable in the one piece molded plastic strain relief bushing 10 as a completed cord set and ready to be installed.

The procedure, of course may be done manually, but in any event, completed cord sets may now be separately stored until they are ready to be engaged.

The latching of the first portion 11 with the second portion 12 engages the columns 28, 29 in the openings 20, 21 and also engages the pins 22 in the openings 27. This engagement holds the closed one piece molded plastic strain relief bushing 10 against any rotative movement of the first portion 11 with relation to the second portion 12, so that there is little likelihood that the hinges 13 are likely to fatigue and break, particularly before insertion of the one piece molded plastic strain relief bushing 10 into the aperture.

The fingers 17, when inserted, flex outwardly until the shoulders 18 engage the inner wall of the aperture. As can be seen in FIGS. 4 and 5, the wall of the aperture is engaged between the shoulders 18 and the head 19. As shown in FIG. 5, the gripping finger 31 of the second portion 12 with its shoulders 32 also engages the wall of the aperture between the gripping finger 31 and the head 23.

The engagement of the one piece molded plastic strain relief bushing 10 in the aperture is a tight engagement because of the arrangement of gripping finger 31, preventing any pivoting of the one piece molded plastic strain relief bushing 10, or loosening of the one piece molded plastic strain relief bushing 10 within the aperture. The key 14 holds the cable, once it is connected to the latch 30. The one piece molded plastic strain relief bushing 10 is reinforced for strength by the reinforcing wall 33 in first portion 11.

Ofentimes further strain relief is obtained by the support that the engaged first portion 11 gets from the inner walls of the aperture. The strain on the cable, strains not only against the key 14 and latch 30, but against the inner wall of the aperture and acts as further strain relief.

The stepped shoulders 18 are adapted to a selection of panel wall thicknesses. This limits the number of different bushings that needed to be provided.

The mold core opening 34 is for construction only and does not have any other function with regard to the one piece molded plastic strain relief bushing 10.

The key 14 serves a double function in that it maintains the cable in the well 26 while the detent 15 grasps the latch 30 to keep the first portion 11 engaged with the second portion 12. The structural double function of the key 14 with its detent 15 engaging the latch 30, provides the necessary strength to the one piece molded plastic strain relief bushing 10 for holding the cable locked within one piece molded plastic strain relief bushing 10 and holding cable when the one piece molded plastic strain relief bushing 10 is engaged in the aperture. The configuration provides maximum strength with maximum bulk for the one piece molded plastic strain relief bushing 10.

The reinforcing wall 33 strengthens the wall of the well 26 in the second portion 12 and helps prevent bulging and loosening of the engagement of the detent 15 with the latch 30.

In FIG. 6, the one piece molded plastic strain relief bush 40 includes a key 14 that has a second detent 41 on the opposite end of the key 14. The second detent 41 has a camming surface 42 which engages a supporting protrusion 43 protruding from the wall of the second portion 12. The supporting protrusion 43 has a camming surface 44. Thus, when the first portion 11 is closed by rotating on the hinges 13, the second detent 41, with its camming surface 42, cams on the camming surface 44 of the supporting protrusion 43 and is engaged thereby. This engagement provides structural strength at both opposite walls of the second portion 12 as a further protection against bulging and disengagement of the detent 15 and latch 30.

The fingers 17 of the first portion 11 engage the wall of the aperture at the upper portion of the one piece molded plastic strain relief bushing 10 and the gripping finger 31 on the underside of the second portion 12 engages the wall of the aperture in the center of the one piece molded plastic strain relief bushing 10 so that the wall of the aperture is tightly held between the fingers 17, gripping finger 31, head 19 and head 23. When this happens, there is little opportunity for the one piece molded plastic strain relief bushing 10 to pivot in the aperture. Further strength in holding the one piece molded plastic strain relief bushing 10 engaged in the aperture may be obtained by the use of alternate grippers 51, as shown in FIG. 7, with regard to one piece molded plastic strain relief bushing 50 where two grippers 51 extend from the bottom of the second portion 12.

In FIG. 8, the one piece molded plastic strain relief bushing 60, has a cover 61 on the head 23. A cable engaged in the one piece molded plastic strain relief bushing 60, instead of passing straight through the one piece molded plastic strain relief bushing 60, enters the cover 61 and is turned 90° to pass through the one piece molded plastic strain relief bushing 60.

As shown in FIG. 9, fingers 17 may be placed on the second portion 12 for properly grasping the wall of an aperture.

As shown in FIG. 10, a cable may be engaged by a narrow key 71 and held in a substantially U shape or S shape for strain relief engagement.

The terms and expressions which are employed are used as terms of description; it is recognized, though, that various modifications are possible.

It is also understood the following claims are intended to cover all of the generic and specific features of the invention herein described; and all statements of the scope of the invention which as a matter of language, might fall therebetween.

Having described certain forms of the invention in some detail, what is claimed is:

1. A one piece molded plastic strain relief bushing comprising a body, said body adapted to receive a cable therethrough, said body including a first portion and a second portion, said first portion and second portion joined by hinge means, one said portion including a key; a head; and gripping means, the other said portion including a head; a well; and gripping means, latch means in said well adapted to engage said first and second portions, said key adapted to hold a cable in said well when said latch means are engaged, and said portions' gripping means are adapted to engage the walls of an aperture between said gripping means and said head.

2. The invention of claim 1 wherein said key is engagable with said latch means.

3. The invention of claim 1 wherein said key includes a detent, said detent is adapted to engage said latch means.

4. The invention of claim 3 wherein detent includes camming means.

5. The invention of claim 1 wherein said key is substantially athwart the width of said first portion.

6. The invention of claim 1 wherein said cable engaged in said well is crimped into a substantial U shape or S shape.

7. The invention of claim 1 wherein said hinge means includes a plurality of hinges.

8. The invention of claim 1 wherein said hinge means includes a hinge at the front of said bushing and a hinge at the rear of said bushing.

9. The invention of claim 2 wherein said latch means is adapted to resiliently flex to engage said key.

10. The invention of claim 1 wherein said first portion gripping means are fingers.

11. The invention of claim 10 wherein said fingers angulate outward extending forward substantially from the rear of said first portion.

12. The invention of claim 11 wherein said fingers are adapted to resiliently flex.

13. The invention of claim 12 wherein said second portion's gripping means is a finger.

14. The invention of claim 13 wherein said second portions' finger is adapted to resiliently flex.

15. The invention of claim 14 wherein said first portion and second portion's fingers include said at least one shoulder for at least one finger.

16. The invention of claim 1 wherein said second portion's gripping means is a finger.

17. The invention of claim 16 wherein said finger is adapted to resiliently flex.

18. The invention of claim 17 wherein said finger includes at least one shoulder.

19. The invention of claim 1 wherein said bushing defines a substantially rectangular configuration when said latch means is engaged.

20. The invention of claim 1 wherein said first and second portions include interactive rigidizing means.

21. The invention of claim 20 wherein said rigidizing means include said at least one interactive set of columns and openings.

22. The invention of claim 20 wherein said rigidizing means include said at least one interactive set of pins and openings.

23. The invention of claim 22 wherein said rigidizing means include said at least one interactive set of columns and openings.

24. The invention of claim 1 wherein said first portion gripping means is substantially adjacent either end of said key.

25. The invention of claim 1 wherein said second portion's gripping means is beneath said well.

26. The invention of claim 25 wherein said first portion gripping means is substantially adjacent either end of said key.

27. The invention of claim 26 wherein said bushing defines a substantially rectangular configuration when said latch means is engaged.

28. The invention of claim 27 wherein said first and second portions' gripping means substantially define a triangular configuration.

29. The invention of claim 28 wherein said bushing is adapted to engaged the walls of an aperture between said first and second portions' gripping means and said first and second portions' heads.

30. The invention of claim 1 including a plurality of said second portion gripping means.

31. The invention of claim 1 including interactive support means between said first and second portions.

32. The invention of claim 1 wherein said key includes support means interactive with said second portion.

33. The invention of claim 32 wherein said support means includes a detent on said key interactive with said second portion.

34. The invention of claim 33 wherein said support means includes a protrusion on said said second portion.

35. The invention of claim 34 wherein said detent and protrusion are rotatably interactable.

36. The invention of claim 1 including a cover on the head of one portion, said cover adapted to turn a cable before entering the body of said one piece molded plastic strain relief bushing.

37. The invention of claim 1 including a narrow key.

38. The method of assembling a strain relief bushing with a cable engaged in an aperture, comprising the steps of providing a one piece molded plastic strain relief bushing, providing said strain relief bushing including a body, adapting said body to receive a cable therethrough, providing a first portion and a second portion, providing hinge means for said first portion and second portions, providing a key; a head; and gripping means for one said portion, providing a head; a well; and gripping means for the other said portion, providing latch means in said well, adapting said latch means to engage said first and second portions, adapting said key to hold cable in said well when said latch means are engaged, adapting said portions' gripping means to engage the walls of an aperture between said gripping means and said head, placing a cable through said body, juxtaposing said first and said second portions, and engaging said first and second portions by latching, whereby said cable is held locked in said well.

39. The method of claim 38 including the step of providing said key engagable with said latch means.

40. The method of claim 38 including the step of providing said key including a detent, and adapting said detent to engage said latch.

41. The method of claim 40 including the step of providing said detent with camming means.

42. The method of claim 38 including the step of providing said key substantially athwart the width of said first portion.

43. The method of claim 38 including the step of crimping said cable engaged in said well in a substantial U shape or S shape.

44. The method of claim 38 including the step of providing said hinge means with a plurality of hinges.

45. The method of claim 38 including the step of providing said hinge means with a hinge at the front of said bushing and a hinge at the rear of said bushing.

46. The method of claim 38 including the step of adapting said latch to resiliently flex to engage said key.

47. The method of claim 38 including the step of providing said first portion gripping means with fingers.

48. The method of claim 47 including the step of adapting said fingers angulated outward extending forward substantially from the rear of said first portion.

49. The method of claim 48 including the step of adapting said fingers to resiliently flex.

50. The method of claim 38 including the step of providing said second portion's gripping means with a finger.

51. The method of claim 50 including the step of adapting said finger to resiliently flex.

52. The method of claim 51 including the step of providing said first portion and second portion's fingers with at least one shoulder for at least one finger.

53. The method of claim 38 including the step of providing said second portion's gripping means with a finger.

54. The method of claim 53 including the step of adapting said finger to resiliently flex.

55. The method of claim 54 including the step of providing said finger with at least one shoulder.

56. The method of claim 38 including the step of providing said bushing with said bushing defining a substantially rectangular configuration when said latch is engaged.

57. The method of claim 38 including the step of providing said first and second portions with interactive rigidizing means.

58. The method of claim 57 including the step of providing said rigidizing means with at least one interactive set of columns and openings.

59. The method of claim 57 including the step of providing said rigidizing means with at least one interactive set of pins and openings.

60. The method of claim 57 including the step of providing said rigidizing means with at least one interactive set of columns and openings.

61. The method of claim 38 including the step of providing said first portion gripping means with said gripping means substantially adjacent either end of said key.

62. The method of claim 38 including the step of providing said second portion's gripping means with said second portion's gripping means beneath said well.

63. The method of claim 62 including the step of providing said first portion's gripping means with said first portion's gripping means substantially adjacent either end of said key.

64. The method of claim 63 including the step of providing said bushing with said bushing defining a substantially rectangular configuration when said latch is engaged.

65. The method of claim 64 including the step of providing said first and second portions' gripping means with said first and second portions' gripping means substantially defining a triangular configuration.

66. The method of claim 65 including the step of adapting said bushing to engaged the walls of an aperture between said first and second portions' gripping means and said first and second portions' heads.

67. The method of claim 38 including the step of engaging said bushing in a aperture.

68. The method of claim 38 including the step of providing a plurality of said second portion gripping means.

69. The method of claim 38 including the steps of providing said key with support means and interacting said key with said second portion.

70. The method of claim 69 including the steps of providing said support means with a detent on said key and interacting said key with said second portion.

71. The method of claim 70 including the steps of providing said support means with a protrusion on said second portion.

72. The method of claim 71 including the step of rotatably interacting said detent and protrusion.

* * * * *